United States Patent [19]
VanDuser

[11] Patent Number: 5,076,528
[45] Date of Patent: Dec. 31, 1991

[54] VEHICLE SEAT ASSEMBLY INCLUDING HEIGHT ADJUSTMENT MECHANISM

[75] Inventor: Harold VanDuser, Reedsburg, Wis.

[73] Assignee: Seats Incorporated, Reedsburg, Wis.

[21] Appl. No.: 638,778

[22] Filed: Jan. 8, 1991

[51] Int. Cl.⁵ .................................... F16M 13/00
[52] U.S. Cl. ............................. 248/419; 248/430
[58] Field of Search ............ 248/157, 161, 419, 420, 248/421, 429, 430; 296/65.1; 297/345

[56] References Cited

U.S. PATENT DOCUMENTS

| | | | |
|---|---|---|---|
| 3,984,078 | 10/1976 | Sturhan | 248/421 X |
| 4,125,242 | 11/1978 | Meiller et al. | 248/421 X |
| 4,322,052 | 3/1982 | Hodge et al. | 248/420 |
| 4,786,024 | 11/1988 | Goetz | 248/157 X |
| 4,813,645 | 3/1989 | Iwami | 248/429 X |
| 4,979,716 | 12/1990 | Holdampf | 248/420 X |
| 5,005,894 | 4/1991 | Nagata | 297/345 |

Primary Examiner—Ramon O. Ramirez
Attorney, Agent, or Firm—Michael, Best & Friedrich

[57] ABSTRACT

A vehicle seat support assembly for supporting a seat for vertical adjustable movement. The seat support assembly includes lower mounting rails which are fixed to the vehicle and an upper seat supporting frame to support a vehicle seat. Pivot links connected between the mounting rails and the upper seat supporting frame support the seat supporting frame for vertical movement with respect to the mounting rails. A locking rail locks the vertical position of the upper seat supporting frame with respect to the lower mounting rails. The locking rail includes a fixed second portion and a first portion fixed to the upper seat supporting frame which is movable forwardly and rearwardly with respect to the second portion of the locking rail.

10 Claims, 3 Drawing Sheets

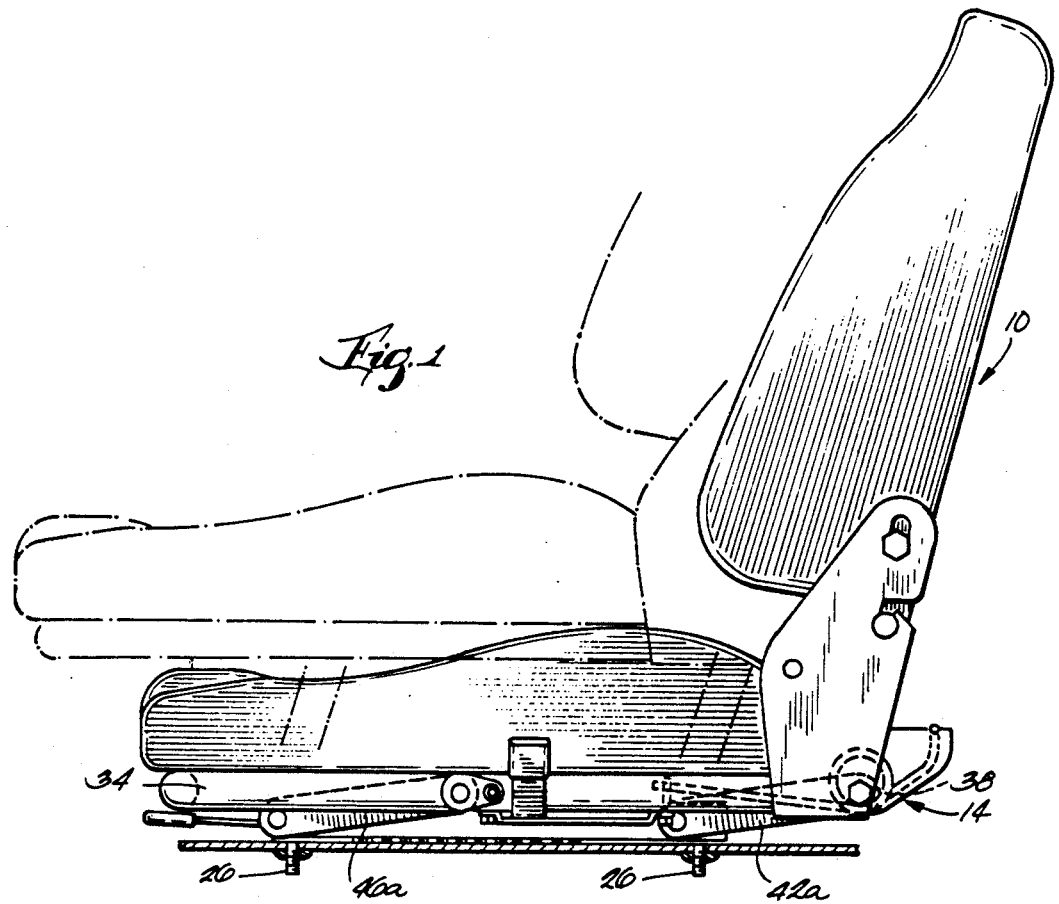
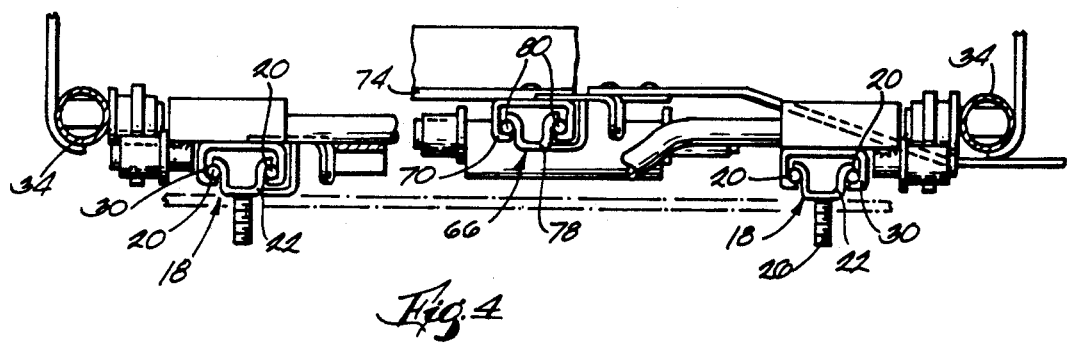

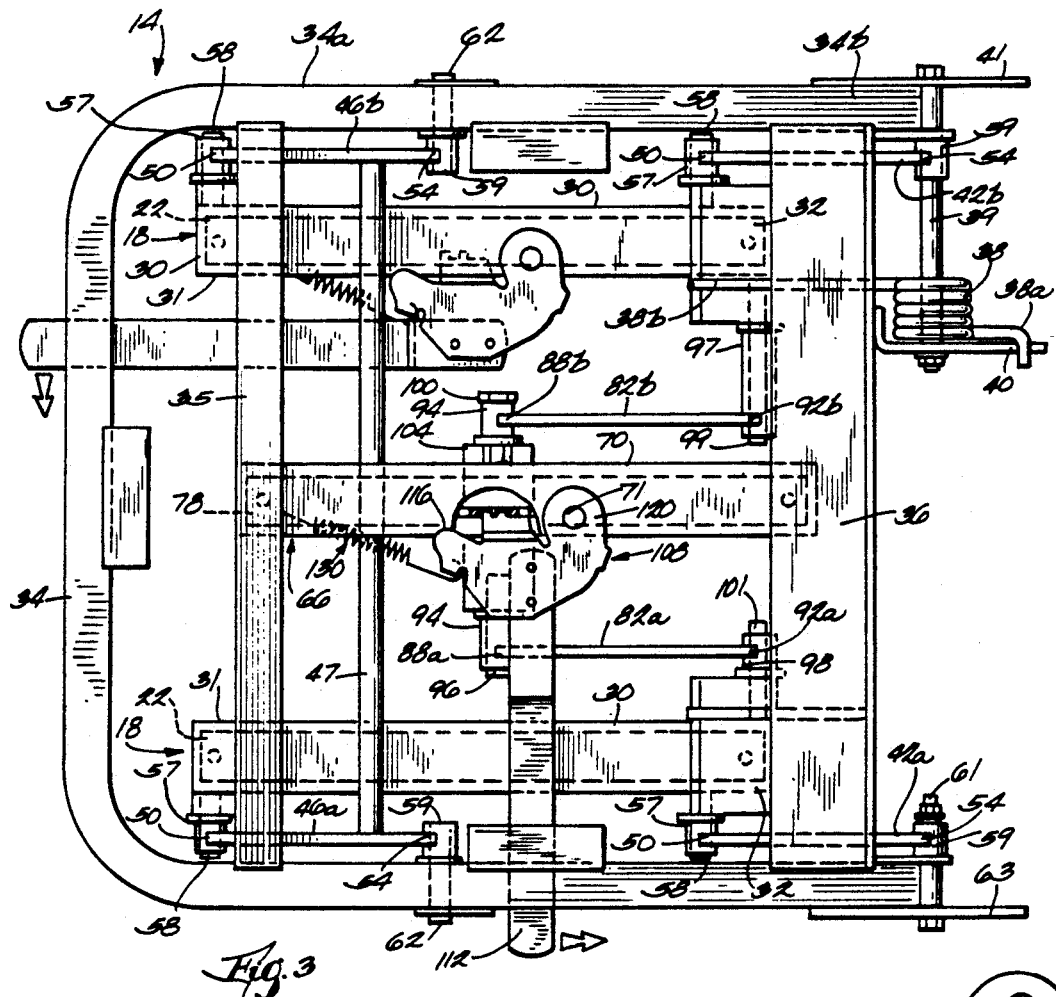
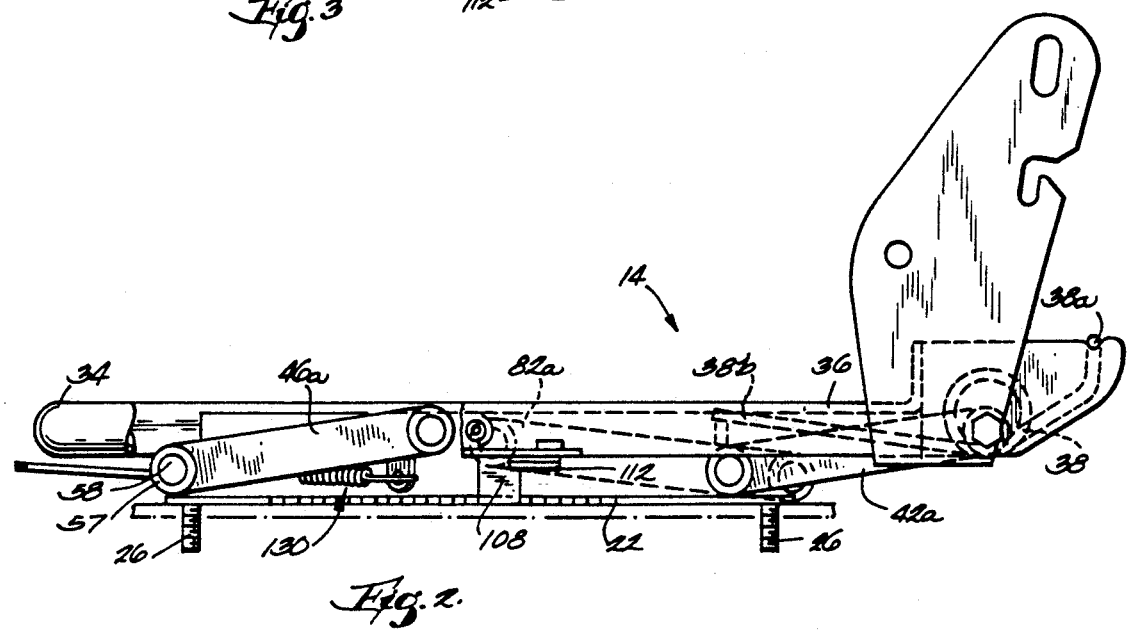

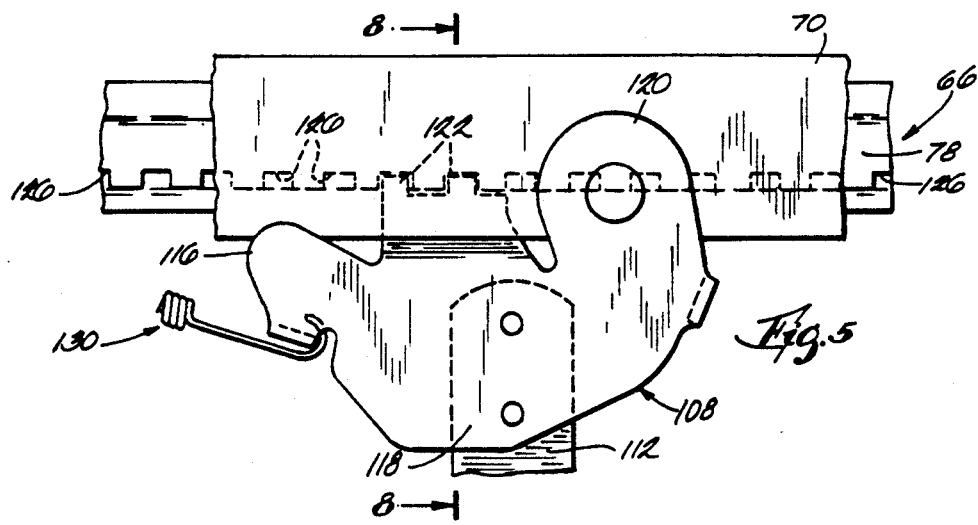
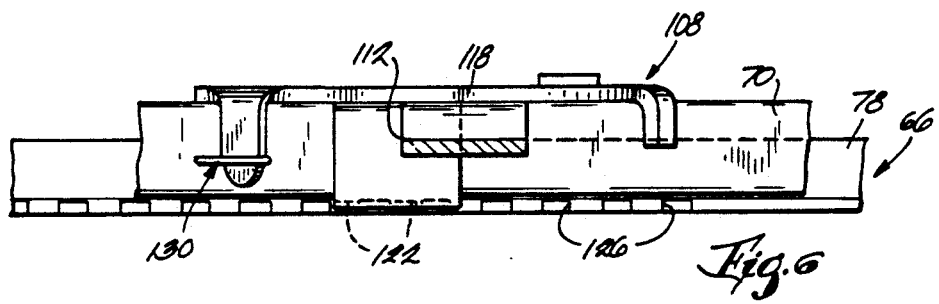
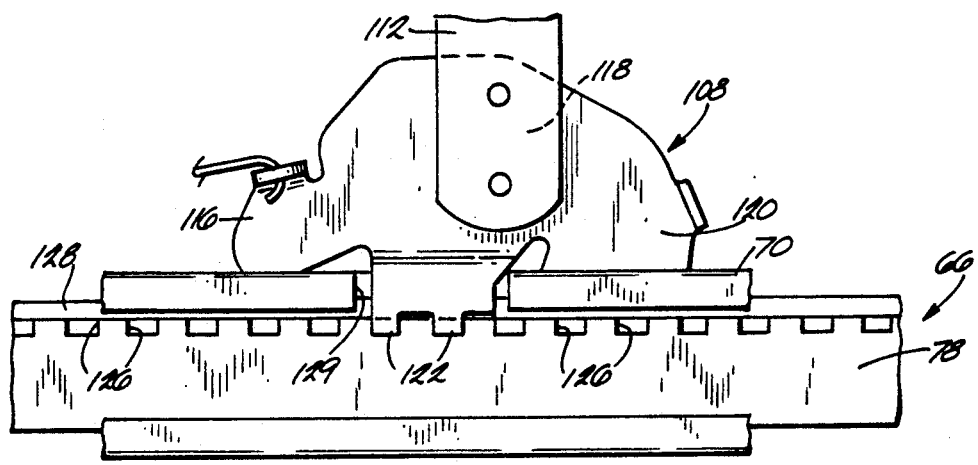
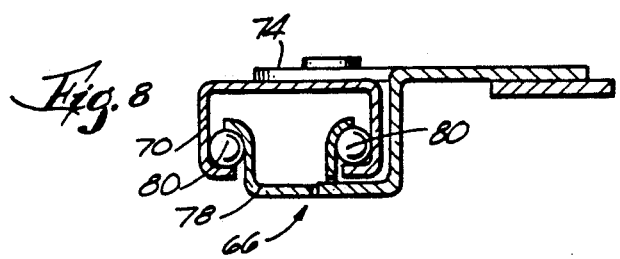

VEHICLE SEAT ASSEMBLY INCLUDING HEIGHT ADJUSTMENT MECHANISM

FIELD OF THE INVENTION

The present invention relates to seats for vehicles and more particularly to seat support assemblies for supporting a seat for vertical adjustable movement.

BACKGROUND PRIOR ART

Prior art seat support assemblies for use in supporting truck seats and other vehicle seats have included structures with various means for controlling the vertical movement of the vehicle seat. One prior art seat support includes a frame which is vertically adjusted by two parallel links each having teeth and an independent pivoting lever which fits into the teeth in the links to control the height of the seat. These seat supports require a substantial vertical space when in the collapsed position and can be used only if there is sufficient clearance between the floor of the vehicle and the bottom of the supported seat.

Another prior art seat support assembly includes an upper housing which is vertically adjusted by a pair of scissor links or parallel links which are raised by tension springs. The scissor links or parallel links are attached to the upper housing and to a height adjustment knob such that the turning of the height adjustment knob will engage the scissor links and raise the seat. This seat support assembly also requires substantial vertical space between the floor of the vehicle and the bottom of the seat.

SUMMARY OF THE INVENTION

The present invention includes a vehicle seat having a seat support assembly providing for vertical adjustable movement of the vehicle seat and the seat support assembly having a compact vertical profile when the seat support assembly is in its collapsed or lowered position. The seat support assembly can be used in vehicles having limited space while providing for vertical adjustment of the seat position.

The seat support assembly of the invention includes at least one lower mounting member adapted to be fixed to the vehicle by bolts, an upper seat supporting frame adapted to support a vehicle seat, and means for supporting the upper seat supporting frame for vertical movement with respect to the mounting member, this structure including at least a pair of parallel pivot links connected between the mounting member and the seat supporting frame. The seat support assembly also includes means for selectively locking the vertical position of the upper seat supporting frame with respect to the lower mounting member. The means for selectively locking includes a locking rail having a first portion fixed to a upper seat frame and movable forwardly and rearwardly with respect to the second portion of the locking rail. The means for locking also includes at least one pivotal link having one end pivotally joined to the second portion of the locking rail and an opposite end pivotally joined to the upper seat supporting frame.

Means are also provided for biasing the upper seat frame upwardly with respect to the lower mounting rails, the means for biasing including a spring having one end connected to the upper seat frame and an opposite end connected to the lower mounting rails.

Various features and advantages of the invention will be apparent from the following detailed description of the invention, from the drawings and from the claims.

BRIEF DESCRIPTION OF THE DRAWINGS

FIG. 1 is a side elevation view of a vehicle seat and a seat support assembly embodying the invention.

FIG. 2 is an enlarged side elevation view of the seat support assembly illustrated in FIG. 1.

FIG. 3 is a plan view of the seat support assembly shown in FIG. 2.

FIG. 4 is an end view of the seat support assembly shown in FIGS. 2 and 3.

FIG. 5 is an enlarged top view of a portion of the seat support assembly shown in FIGS. 2-4.

FIG. 6 is a side view of the portion of the seat support assembly shown in FIG. 5.

FIG. 7 is a bottom view of the portion of the seat support assembly shown in FIG. 5.

FIG. 8 is a sectional view taken along line 8—8 in FIG. 5.

Before describing a preferred embodiment of the invention in detail it is to be understood that the invention is not limited in its application to the details of construction and to the arrangements set forth in the following description or illustrated in the drawings. The invention is capable of further embodiments and of being practiced and carried out in various ways. Also it is to be understood that the phraseology and terminology employed herein is for the purpose of description and should not be regarded as limiting.

DESCRIPTION OF A PREFERRED EMBODIMENT

Illustrated in FIG. 1 is a vehicle seat 10 supported by a seat support assembly 14 including a pair of lower mounting rails 18 (FIGS. 3 and 4), the lower mounting rails 18 each having a fixed rail portion 22 adapted to be fixed to the vehicle by bolts 26 and an upper or movable rail portion 30 having a forward end 31 and a rearward end 32 and adapted to move forwardly and rearwardly on the fixed rail portion 22. Ball bearings 20 support the movable rail portion 30 for rolling movement with respect to the fixed rail portion 22. The seat support assembly 14 also includes an upper seat support frame 34 adapted to support a vehicle seat 10. While the seat support frame 34 could have other constructions, in the illustrated arrangement the seat support frame 34 includes a generally "U" shaped member having a forward end 34a and a rearward end 34b as seen in FIG. 3, the support frame 34 including a forward transverse frame member 35 rigidly joined to and extending across the forward end of the "U" shaped member and a rearward transverse frame member 36 rigidly joined to and extending across the rearward end of the "U" shaped member. The seat support frame 34 also includes a torsion spring 38 having first and second ends 38a and 38b which is supported by a rod 39. One end of the rod 39 is supported by a rearwardly extending bracket 40 fixed to the transverse frame member 36 and the other end of the rod 39 is supported by a plate 41 fixed to the rearward end 34b of the seat support frame 34. The end 38a of the torsion spring 38 is supported by the rearwardly extending bracket 40 and the other end 38b of the torsion spring engages a rod 58 which is fixed to the movable rail portion 30 of the lower mounting rail 18. The torsion spring 38 biases the upper seat frame 34 upwardly, away from the lower mounting rails 18 which are fixed to the vehicle floor.

Means are also provided for supporting the seat support frame 34 for vertical movement with respect to the lower mounting rails 18. While the means for supporting the seat support frame could have other constructions, in the illustrated arrangement the means for supporting the seat support frame includes two pairs of pivot links 42a, 46a and 42b, 46b connecting the seat support frame 34 to the movable rail portions 30 of the lower mounting rails. The pivot links each have opposite ends 50 and 54, one end 50 pivotally connected to the movable rail portions 30 and an opposite end 54 pivotally connected to the seat support frame. The seat support frame 34 is vertically movable in response to pivotal movement of the pivot links. In the illustrated arrangement, the pivot links 42a and 46a are supported such that they are mutually parallel, and one link 46a is pivotally connected to a forward end 31 of the first movable rail portion 30 and a second link 42a is pivotally connected to a rearward end 32 of the first movable rail portion 30. A second pair of pivot links 42b and 46b are connected in the same manner to the other movable rail portion, one of the pivot links 46b pivotally joined to a forward end 31 of that rail portion and a second one of the pivot links 42b being joined to the rearward end 32 of that rail portion. While the pivot links 42a, 46a, 42b and 46b could be joined to the movable rails 30 in various ways, in the illustrated arrangement the ends 50 of the pivot links 42a, 46a, 42b and 46b each include a sleeve 57 fixed thereto, the sleeve 57 mounted on a rod 58 which is fixed to the movable rail portion 30 of the lower mounting rails 18.

While the pivot links could be joined to the seat supporting frame in other ways, in the illustrated arrangement the ends 54 of the pivot links 46a and 46b each include a sleeve 59 fixed thereto, the sleeve 59 being mounted on a rod 62 which is fixed to the seat frame 34. In the illustrated arrangement the rearward ends of the links 46a and 46b are also joined together for common movement by a connecting rod 47. The pivot links 42a and 46a similarly each include an end 54, the ends 54 each having a sleeve 59 fixed thereto. Sleeve 59 of link 42a is mounted on a rod or pin 61 supported by a bracket 63 extending rearwardly from the seat support frame 34 and fixed to the seat support frame. The sleeve 59 fixed to pivot link 42b is mounted on the rod 39.

The seat support assembly 14 also includes means for selectively locking the vertical position of the upper seat frame with respect to the lower mounting rails, the means for selectively locking including a locking rail 66 including a first or top portion 70 fixed to the upper seat frame 34, the top portion being relatively movable forwardly and rearwardly with respect to the second or bottom portion 78 of the locking rail 66. Ball bearings 80 (FIGS. 4 and 8) support the top rail portion 70 for relative movement forwardly and rearwardly with respect to the bottom rail portion 78. In the illustrated arrangement the forward end of the top portion 70 of the locking rail is fixed to the cross member 35 of the seat support frame and the rearward end of the top portion is fixed to the cross member 36.

A pair of pivotal links 82a and 82b having opposite ends 88a, 88b, 92a and 92b are also provided. These links 82a and 82b are parallel to each other. End 88a and 88b of each link is pivotally joined to the bottom rail portion 78 of the locking rail, and ends 92a and 92b of the links 82a and 82b are pivotally connected to the upper seat frame 34. While the pivot links 82a and 82b could be joined to the bottom rail portion 78 of locking rail 66 in various ways, in the illustrated arrangement the ends 88a and 88b of the pivot links 82a and 82b include a sleeve or barrel 94 supported on a rod 96 and a bolt 100 respectively. Likewise, ends 92a and 92b of the pivot links 82a and 82b include sleeves or barrels 97 and 98, respectively, which are supported on rods 99 and 101 respectively. A bracket 104 extends between the rod 96 and bolt 100 across the locking rail 66 and is fixed to the bottom portion 78 of the locking rail 66. The bottom portion 78 of the locking rail 66 is fixed with respect to the rod 96 and bolt 100 which act as pivot surfaces for pivot links 82a and 82b.

Means are also provided for selectively preventing relative movement of the top portion 70 of the locking rail with respect to the second or bottom portion 78 of the locking rail. This means for selectively preventing relative movement includes a latch 108 pivotally connected to the portion 70 of the locking rail and selectively engageable with locking rail portion 78. A movable lever 112 has an end fixed to the latch 108 and is movable to provide for selective pivotal movement of the latch. While the latch 108 could have other constructions, in the illustrated arrangement, best shown in FIGS. 5-8, the latch 108 has a front portion 116, and a middle portion 118 and a rear portion 120. The rear portion 120 of the latch is pivotally connected to the top portion 70 of the locking rail 66 by a pin 71. The lever 112 is attached to the latch near the middle portion 118 of the latch. The middle portion of the latch further includes teeth 122 which engage recesses 126 in a side 128 of the portion 78 of the locking rail 66. The teeth 122 are able to engage the recesses because there is an opening 129 (see FIG. 7) in the top portion 70 of the locking rail so that the teeth 122 can be received in the recesses 126 in the second portion 78 of the locking rail. A tension spring 130 is attached to the front portion 116 of the latch and to the forward end of the top portion 20 of locking rail 66 so as to bias the latch 108 forwardly toward a position wherein the teeth of the latch are maintained in engagement with the recesses 126.

When the lever 112 is moved rearwardly (to the right in FIG. 3), the latch 108 pivots and the teeth 122 move out of the recesses 126 in the bottom portion of the locking rail such that the top portion 70 of the locking rail 66 is movable with respect to the bottom portion 78 of the locking rail 66. When the lever 112 is released, the spring 130 forces the latch 108 to a position wherein the teeth 122 will again engage the recesses in the bottom portion 78 of the locking rail 66 to prevent the seat from raising any higher.

Various features of the invention are set forth in the following claims.

I claim:

1. A vehicle seat support comprising:
   at least one lower mounting member,
   an upper seat frame adapted to support a vehicle seat,
   means for supporting the upper seat frame for vertical movement with respect to the lower mounting member, the means for supporting the upper seat frame for vertical movement including at least a pair of pivot links connecting the upper seat frame to the lower mounting member, the pivot links each having opposite ends, one end of the pivot links being pivotally connected to the lower mounting member and an opposite end of the pivot links being pivotally connected to the upper seat frame, and means for selectively locking the vertical position of the upper seat frame with respect to the lower mounting member, the means for selectively locking including a locking mounting rail including a first portion fixed to the upper seat frame and movable with the upper seat frame and a second portion movable with respect to the first portion of the locking mounting rail, and the means for selectively locking including at least one pivotal link having opposite ends, one of the opposite ends of the pivotal link being pivotally joined to the second portion of the locking mounting rail and an opposite end of the pivotal link being pivotally connected to the upper seat frame, and means for selectively locking the first portion of the locking mounting rail from relative movement with respect to the second portion of the locking mounting rail.

2. A vehicle seat support as set forth in claim 1 wherein said lower mounting member includes a fixed rail portion adapted to be fixed to the vehicle and a movable rail portion adapted to move forwardly and rearwardly on the fixed rail portion.

3. A vehicle seat support as set forth in claim 1 wherein said pair of pivot links of said supporting means are parallel and the upper seat frame is vertically movable in response to pivotal movement of the pivot links.

4. A vehicle seat support as set forth in claim 1 wherein said means for locking further includes latch means for selectively preventing relative movement of the first portion of the locking mounting rail with respect to the second portion of the locking mounting rail, said latch means including a movable lever having one end attached to said latch means such that movement of said lever will cause movement of said latch means.

5. A vehicle seat support as set forth in claim 1 and further comprising means for biasing the upper seat frame upwardly with respect to the lower mounting member, the means for biasing including a spring having opposite ends, one end connected to the upper seat frame and an opposite end connected to the lower mounting member.

6. A vehicle seat supporting assembly comprising:
a pair of lower mounting rails each including a fixed rail portion adapted to be fixed to the vehicle, and a movable rail portion supported by the fixed rail portion and adapted to move forwardly and rearwardly with respect to the fixed rail portion,
an upper seat frame adapted to support a vehicle seat,
means for supporting the upper seat frame for vertical movement with respect to the lower mounting rails, the means for supporting the upper seat frame including at least a pair of pivot links connecting the upper seat frame to the movable rail portions of the lower mounting rails, the pivot links each having opposite ends, one end of each of the pivot links being pivotally connected to the movable rail portions and opposite ends of each of the pivot links being pivotally connected to the upper seat frame, and
means for selectively locking the vertical position of the upper seat frame with respect to the lower mounting rails, the means for selectively locking including a locking rail including a first portion fixed to the upper seat frame and a second portion movable forwardly and rearwardly with respect to the first portion of the locking rail, at least one pivotal link having opposite ends, one end of the pivotal link pivotally joined to the second portion of the locking rail and an opposite end of the pivotal link pivotally connected to the upper seat frame, and means for selectively locking the first portion of the locking rail from movement with respect to the second portion of the locking rail.

7. A vehicle seat supporting assembly as set forth in claim 6 wherein said pairs of pivot links of said supporting means are parallel and the upper seat frame is vertically movable in response to pivotal movement of the pivot links.

8. A vehicle seat supporting assembly as set forth in claim 6 wherein said means for locking further includes latch means for selectively preventing relative movement of the first portion of the locking rail with respect to the second portion of the locking rail, the latch means including a movable lever having one end attached to said latch means such that movement of said lever will cause movement of said latch means.

9. A vehicle seat supporting assembly as set forth in claim 6 further comprising means for biasing the upper seat frame upwardly with respect to the lower mounting rails, the means for biasing including a spring having opposite ends, one end connected to the upper seat frame and an opposite end connected to the lower mounting rails.

10. A seat support assembly for a vehicle seat, the seat support assembly comprising:
a lower mounting rail including a fixed rail portion adapted to be fixed to the vehicle by bolts and a movable rail portion adapted to move forwardly and rearwardly on the fixed rail portion,
an upper seat frame adapted to support a vehicle seat,
means for supporting the upper seat frame for vertical movement with respect to the lower mounting rail, the means for supporting the upper seat frame including two pairs of pivot links connecting the upper seat frame to the movable rail portion of the lower mounting rail, the pivot links each having opposite ends, one end pivotally connected to the movable rail portion and an opposite end pivotally connected to the upper seat frame, the pivot links being mutually parallel, and the upper seat frame being vertically movable in response to pivotal movement of the pivot links,
a locking rail including a first portion fixed to the upper seat frame and supporting the upper seat frame, the first portion being movable forwardly and rearwardly with respect to a second portion of the locking rail,
a pair of pivotal links having opposite ends, one end of each pivotal link being pivotally joined to the second portion of the locking rail and the opposite end of each pivotal link being pivotally joined to the movable rail portion of the lower mounting rail,
means for biasing the upper seat frame upwardly with respect to the lower mounting rail, the means for biasing including a spring having opposite ends, one end connected to the upper seat frame and an opposite end connected to the lower mounting rail, and
means for selectively locking the first portion of the locking rail from movement with respect to the second portion of the locking rail, the means for locking including latch means for selectively preventing relative movement of the first portion of the locking rail with respect to the second portion, the latch means including a movable lever having one end attached to the latch means.

* * * * *

UNITED STATES PATENT AND TRADEMARK OFFICE
CERTIFICATE OF CORRECTION

PATENT NO. : 5,076,528
DATED : December 31, 1991
INVENTOR(S) : Harold VanDuser

It is certified that error appears in the above-identified patent and that said Letters Patent is hereby corrected as shown below:

Col. 2, line 66, after "spring engages a" insert --bracket supported by a--.

Col. 4, line 1, delete "upper seat frame 34" and insert therefor --the movable rail portions 30 of the lower mounting rails 18--.

Claim 1, col. 5, line 16, delete "upper seat frame" and insert therefor --lower mounting member--.

Claim 6, col. 6, lines 2-3, delete "upper seat frame" and insert therefor --movable rail portion of one of the lower mounting rails--.

Claim 7, col. 6, line 7, delete "pairs" and insert therefor --pair--.

Claim 10, col. 6, line 35, delete "two pairs" and insert therefor --a pair--;
line 45, delete "the first" and insert therefor --and a second--;
line 46, delete "a second" and insert therefor --the first--
line 66, delete "the latch means including" and insert therefor --and--.

Signed and Sealed this

Eighth Day of December, 1992

*Attest:*

DOUGLAS B. COMER

*Attesting Officer*    Acting Commissioner of Patents and Trademarks